United States Patent
Aiglstorfer et al.

(10) Patent No.: US 12,139,340 B2
(45) Date of Patent: Nov. 12, 2024

(54) ROBOT SYSTEM FOR GRIPPING AN ITEM IN A STORAGE AND PICKING SYSTEM, AND OPERATING METHOD FOR SAME

(71) Applicant: TGW Logistics Group GmbH, Marchtrenk (AT)

(72) Inventors: Stefan Aiglstorfer, Arnreit (AT); Christian Prechtl, Voecklabruck (AT); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 687 days.

(21) Appl. No.: 16/978,318

(22) PCT Filed: Mar. 7, 2019

(86) PCT No.: PCT/AT2019/060075
§ 371 (c)(1),
(2) Date: Sep. 9, 2020

(87) PCT Pub. No.: WO2019/169417
PCT Pub. Date: Sep. 12, 2019

(65) Prior Publication Data
US 2021/0047115 A1    Feb. 18, 2021

(30) Foreign Application Priority Data
Mar. 9, 2018 (AT) .............................. A 50205/2018

(51) Int. Cl.
*G06F 7/00* (2006.01)
*B25J 9/00* (2006.01)
(Continued)

(52) U.S. Cl.
CPC .......... *B65G 1/1373* (2013.01); *B25J 9/0093* (2013.01); *B25J 9/1666* (2013.01); *B25J 9/1669* (2013.01);
(Continued)

(58) Field of Classification Search
CPC ..... B65G 1/1373; B25J 9/0093; B25J 9/1666; B25J 9/1669; B25J 9/1697; B25J 13/08;
(Continued)

(56) References Cited

U.S. PATENT DOCUMENTS

| 4,242,025 A | 12/1980 | Thibault |
| 5,564,893 A | 10/1996 | Tacchi et al. |

(Continued)

FOREIGN PATENT DOCUMENTS

| AT | 511 867 A1 | 3/2013 |
| CN | 201711969 U | 1/2011 |

(Continued)

OTHER PUBLICATIONS

International Search Report in PCT/AT2019/060075, mailed Jul. 17, 2019.

(Continued)

*Primary Examiner* — Yolanda R Cumbess
(74) *Attorney, Agent, or Firm* — Collard & Roe, P.C.

(57) ABSTRACT

A robot system includes a robot having a movable robot head with at least two suction grippers spaced apart from one another and a sensor system for detecting a gripping surface pose and a gripping surface size of a gripping surface of a good. Using a controller, a gripping pose for the movable robot head, in which a maximum number of suction grippers is in contact with the gripping surface of the good, is calculated based on the determined gripping surface pose and gripping surface size. Then, the robot head is moved into the calculated gripping pose where the suction grippers are activated so as to grip the good. Moreover, a method operates the robot system.

25 Claims, 5 Drawing Sheets

(51) Int. Cl.
*B25J 9/16* (2006.01)
*B25J 13/08* (2006.01)
*B25J 15/00* (2006.01)
*B25J 15/06* (2006.01)
*B65G 1/137* (2006.01)

(52) U.S. Cl.
CPC .......... *B25J 9/1697* (2013.01); *B25J 13/08* (2013.01); *B25J 15/0061* (2013.01); *B25J 15/0625* (2013.01)

(58) Field of Classification Search
CPC ............. B25J 15/0061; B25J 15/0625; B25J 15/0052; B25J 15/0616; B25J 9/1612; G05B 2219/40006; G05B 2219/40053
USPC ............................. 700/213, 214, 230
See application file for complete search history.

(56) References Cited

U.S. PATENT DOCUMENTS

| | | | |
|---|---|---|---|
| 5,605,432 | A | 2/1997 | Fink et al. |
| 6,681,151 | B1 | 1/2004 | Weinzimmer et al. |
| 8,788,086 | B2 | 7/2014 | Franz |
| 9,026,243 | B2 | 5/2015 | Radwallner et al. |
| 9,205,558 | B1* | 12/2015 | Zevenbergen ......... B25J 9/1664 |
| 9,381,645 | B1 | 7/2016 | Yarlagadda et al. |
| 9,452,894 | B2 | 9/2016 | Puchwein et al. |
| 9,457,477 | B1* | 10/2016 | Rublee ................. B25J 15/0023 |
| 9,665,946 | B2 | 5/2017 | Oda |
| 9,751,693 | B1 | 9/2017 | Battles et al. |
| 9,827,677 | B1 | 11/2017 | Gilbertson et al. |
| 9,868,207 | B2 | 1/2018 | Wellman |
| 9,926,138 | B1* | 3/2018 | Brazeau .................. B25J 5/007 |
| 10,108,194 | B1* | 10/2018 | Russell ................. G05D 1/0212 |
| 10,549,928 | B1 | 2/2020 | Chavez et al. |
| 10,625,305 | B2 | 4/2020 | Wagner et al. |
| 10,773,839 | B1 | 9/2020 | Talda et al. |
| 10,926,408 | B1 | 2/2021 | Vogelsong et al. |
| 11,514,386 | B1 | 11/2022 | Soles et al. |
| 11,858,743 | B2 | 1/2024 | Bauman et al. |
| 2005/0226711 | A1 | 10/2005 | Schnoor et al. |
| 2006/0182545 | A1 | 8/2006 | Ray et al. |
| 2008/0181753 | A1 | 7/2008 | Bastian et al. |
| 2009/0279999 | A1 | 11/2009 | Faulkner et al. |
| 2010/0221094 | A1 | 9/2010 | Kuehnemann et al. |
| 2011/0170998 | A1 | 7/2011 | Winkler |
| 2011/0264259 | A1* | 10/2011 | Boyer .................. G07F 11/165 901/14 |
| 2013/0041495 | A1 | 2/2013 | Moore et al. |
| 2014/0023461 | A1 | 1/2014 | Schaller et al. |
| 2014/0205403 | A1 | 7/2014 | Criswell |
| 2014/0234066 | A1* | 8/2014 | Mathi ................. B65G 1/1376 414/751.1 |
| 2014/0244026 | A1 | 8/2014 | Neiser |
| 2015/0057793 | A1 | 2/2015 | Kawano |
| 2015/0314439 | A1 | 11/2015 | Wang et al. |
| 2015/0336741 | A1 | 11/2015 | Ahammer et al. |
| 2015/0370239 | A1 | 12/2015 | Pronold |
| 2016/0009493 | A1 | 1/2016 | Stevens et al. |
| 2016/0016311 | A1 | 1/2016 | Konolige et al. |
| 2016/0207195 | A1* | 7/2016 | Eto ...................... B25J 15/0616 |
| 2016/0236867 | A1 | 8/2016 | Brazeau et al. |
| 2016/0244262 | A1 | 8/2016 | O'Brien et al. |
| 2016/0297611 | A1 | 10/2016 | Williams et al. |
| 2017/0050315 | A1 | 2/2017 | Henry et al. |
| 2017/0088360 | A1 | 3/2017 | Brazeau et al. |
| 2017/0151673 | A1 | 6/2017 | Kobayashi et al. |
| 2017/0322561 | A1 | 11/2017 | Stiernagle |
| 2018/0057263 | A1 | 3/2018 | Beer |
| 2018/0257225 | A1 | 9/2018 | Satou |
| 2019/0102965 | A1* | 4/2019 | Greyshock ............. G07F 9/002 |
| 2019/0185267 | A1 | 6/2019 | Mattern et al. |
| 2019/0270197 | A1 | 9/2019 | Wagner et al. |
| 2020/0078935 | A1 | 3/2020 | Kimura et al. |
| 2020/0385209 | A1 | 12/2020 | Garcia et al. |

FOREIGN PATENT DOCUMENTS

| | | |
|---|---|---|
| CN | 202640363 U | 1/2013 |
| CN | 205552559 U | 9/2016 |
| CN | 206066477 U | 4/2017 |
| DE | 44 07 324 A1 | 9/1994 |
| DE | 10 2007 005 534 A1 | 8/2008 |
| DE | 10 2015 007 863 A1 | 12/2015 |
| DE | 10 2015 011 527 A1 | 3/2016 |
| DE | 10 2016 008 078 A1 | 1/2018 |
| EP | 0 616 874 A1 | 9/1994 |
| EP | 1 986 165 A1 | 10/2008 |
| EP | 2 315 714 B1 | 10/2012 |
| EP | 2 650 237 A1 | 10/2013 |
| EP | 2 783 799 A2 | 10/2014 |
| EP | 2 923 971 A1 | 9/2015 |
| EP | 3 112 295 A1 | 1/2017 |
| EP | 2 984 007 B1 | 3/2017 |
| EP | 3 248 915 A1 | 11/2017 |
| EP | 3 263 292 A1 | 1/2018 |
| JP | S52-59475 A | 5/1977 |
| JP | H06-39387 U | 5/1994 |
| JP | 2003-181786 A | 7/2003 |
| JP | 56-17512 B2 | 11/2014 |
| JP | 2018-015815 A | 2/2018 |
| WO | 2006/065147 A1 | 6/2006 |
| WO | 2009/094995 A1 | 8/2009 |
| WO | 2012/163666 A1 | 12/2012 |
| WO | 2013/090970 A2 | 6/2013 |
| WO | 2015/118171 A1 | 8/2015 |
| WO | 2016010968 A1 | 1/2016 |
| WO | 2016/100235 A1 | 6/2016 |
| WO | 2016/138101 A1 | 9/2016 |
| WO | 2017/143367 A1 | 8/2017 |
| WO | 2017/198281 A1 | 11/2017 |
| WO | 2018/006112 A1 | 1/2018 |
| WO | 2018132855 A1 | 7/2018 |

OTHER PUBLICATIONS

International Search Report in PCT/AT2019/060076, mailed Jul. 15, 2020.
International Search Report in PCT/AT2019/060077, mailed Sep. 11, 2019.
International Search Report in PCT/AT2019/060078, mailed Jul. 24, 2019.
Monkman, Gareth J. et al., "Robot Grippers" WWeinheim: Wiley-VCH Verlag Gmbh & Co. KGaA, 2007.

* cited by examiner

ROBOT SYSTEM FOR GRIPPING AN ITEM IN A STORAGE AND PICKING SYSTEM, AND OPERATING METHOD FOR SAME

CROSS REFERENCE TO RELATED APPLICATIONS

This application is the National Stage of PCT/AT2019/060 filed on Mar. 7, 2019, which claims priority under 35 U.S.C. § 119 of Austrian Application No. A50205/2018 filed on Mar. 9, 2018, the disclosure of which is incorporated by reference. The international application under PCT article 21 (2) was not published in English.

BACKGROUND OF THE INVENTION

1. Field of the Invention

The invention relates to a method for picking goods using a robot in a storage and order-picking system, said robot having a robot head movable in relation to a robot base and comprising at least two suction grippers spaced apart from one another wherein a gripping surface pose and a gripping surface size of a gripping surface of a good are determined by means of a sensor system. The invention further relates to a robot system for picking goods, which comprises a robot having a robot head that is movable in relation to a robot base and is equipped with at least two suction grippers spaced apart from one another, as well as a sensor system for detecting a gripping surface pose and a gripping surface size of a gripping surface of a good. Finally, the invention also relates to a storage and order-picking system for picking goods, comprising a storage area for storing goods and a working area for picking/repacking goods using a robot system of the aforementioned type.

2. Description of the Related Art

A method, a robot system and a storage and order-picking system of the mentioned type are in general known from U.S. Pat. No. 9,868,207 B2, EP 2 984 007 B1, EP 2 315 714 B1 and WO 2016/138101 A1. For example, U.S. Pat. No. 9,868,207 B2 discloses a robot for gripping goods in a storage system. In the course of this, information on gripping the mentioned goods can be determined and, in connection with a database, be used for determining a gripping strategy.

The problem of the known methods and robot systems is that secure gripping of goods cannot be ensured and thus incorrect gripping of goods and/or falling of goods from the robot head often occurs.

SUMMARY OF THE INVENTION

It is thus the object of the invention to provide an improved method for picking goods using a robot in a storage and order-picking system, an improved robot system as well as an improved storage and order-picking system for picking goods. In particular, the above-mentioned shortcomings are to be overcome and incorrect gripping and/or falling of goods from the robot head is to be avoided.

This object is achieved by a method of the initially mentioned type, in which
a gripping pose for the movable robot head, in which a maximum number of suction grippers is in contact with the gripping surface of the good, is calculated based on the determined gripping surface pose and gripping surface size, and
the robot head is moved into the calculated gripping pose and the suction grippers that are or are coming into contact with the gripping surface of the good are activated so as to grip the good.

The object of the invention is further achieved by a robot system of the initially mentioned type, which comprises a controller, which is configured to
calculate a gripping pose for the movable robot head, in which a maximum number of suction grippers is in contact with the gripping surface of the good, based on the determined gripping surface pose and gripping surface size, and
move the robot head into the calculated gripping pose and activate the suction grippers that are or are coming into contact with the gripping surface of the good so as to grip the good.

Finally, the object of the invention is also achieved by an (essentially automated) storage and order-picking system of the initially mentioned type, which comprises a (fully automated) robot system of the aforementioned type, which is in particular connected to the storage area in terms of conveyance.

By the suggested measures, secure gripping of goods can be ensured and incorrect gripping and/or falling of goods from the robot head can be widely avoided. The invention proves particularly advantageous if the gripping surface of a good is not large enough to be in contact with all suction grippers of the robot head. The goods can be arranged in or on the first goods carrier next to each other, on top of each other, standing upright or lying down, in particular disordered (chaotic) and/or in a random arrangement. "Random arrangement" in the present context refers to the undefined position and location of a good in or on the first goods carrier and/or the disordered, chaotic or random distribution of the goods in or on the first goods carrier.

The robot head can be mounted so as to rotatable about one or multiple axes in relation to a robot base, i.e. about a vertical axis (z axis) and/or at least one horizontal axis (x axis, y axis). Thus, not rotations of the robot head are possible not only about the vertical axis and/or the horizontal axis, but also in combination about a general axis (corresponding to a combination of a rotation of the robot head about the vertical axis and about a horizontal axis), for example when the good to be gripped is in the tilted position or lies on the goods carrier. The robot head can be mounted so as to be rotatable in the manner described above in particular about one or multiple axis in relation to a robot head base, which is mounted so as to be displaceable in the vertical axis and/or in one or multiple horizontal axes in relation to a (stationary) robot base. Thus, in this case, the robot head base is displaceable in the space, the robot head is rotatable in relation to said robot head base. This design is in particular realized by a serial-kinematic gantry robot, in which the rotational axes of the robot head—based on the serial-kinematic logic—form the movement axes of the robot furthest away from the robot base. Thus, starting out from the robot base, the rotational axes follow the translation axes. Such a robot system with a gantry robot is described in the Austrian patent application A 50886/2018, FIGS. 8-14 and is made a subject matter of the present disclosure. However, in general, serial-kinematic robots, which merely have rotational axes (articulated-arm robots), as well as parallel-kinematic robots (e.g. hexapods) can also be used without restrictions for the presented method. By the suggested measures, accessibility to practically all goods is possible, also if these are in random arrangement in or on the first goods carrier.

The term "robot head" generally refers to that part of the robot on which the suction grippers are arranged and/or mounted. Multiple suction grippers are combined to a group on the robot head. Accordingly, a group of multiple suction grippers also forms a "suction gripper unit".

In the context of the invention, a "good" in particular is understood as an object that can be handled individually and/or a group of objects that can be handled individually.

A "position" generally is the combination of location and alignment in space. A "gripping surface pose" accordingly is the combination of location and alignment of the gripping surface of a good and the "gripping pose" is the combination of location and alignment of the robot head, where a maximum number of suction grippers is in contact with the gripping surface of a good.

In general, a "gripping surface" of a good, which serves for gripping said good with the robot, can have any desired shape and can for example be polygonal (especially rectangular), circular or elliptical or even be formed by a free-form surface.

In a "storage and order-picking system", goods can for example be delivered to a goods receiving and then optionally be repacked and stored in a storage area. The goods can also be picked according to an order, meaning that they can be retrieved from the storage area, collected to an order and provided for transport at a goods issue. In contrast to a manufacturing process, the goods are not substantially changed between the goods receiving and the goods issue. However, a slight change in shape is possible, in particular in case of non-rigid bodies such as pouches or bags or other resilient packaging, for example from cardboard or plastic materials.

It is favorable if the goods can be transferred from or out of a first goods carrier into or onto a second goods carrier using the robot head according to an order. A "goods carrier" can for example be a loading aid (such as a box, a tray or a container or a pallet) or can be formed by a conveyor (such as a belt conveyor, a roller conveyor or a chain conveyor). However, a "goods carrier" can also be formed by a transport platform (for example on a storage and retrieval unit or an autonomous transport vehicle). In this context the first goods carrier serves as the "source", the second goods carrier serves as the "target". The second goods carrier can for example also be formed by a pivotable flap. In this case, the robot grips a good from or out of the source and places it on the flap. After this, the good can be discharged into a further container, for example by actuating, i.e. elevating, the flap.

Moreover, it is advantageous if, according to an order, the goods
  are transported to the robot using the first goods carrier,
  are transferred from or out of the first goods carrier into or onto the second goods carrier using the robot head, and
  are transported away from the robot using the second goods carrier.

In this variant, the goods are transported to the robot, for example directly on a belt conveyor, a roller conveyor or a chain conveyor, and/or with a loading aid on a belt conveyor, a roller conveyor or a chain conveyor. Thus, the robot can statically remain in one place. However, in general, it would also be conceivable that the robot is designed as a mobile robot. For example, the robot can be installed on an autonomous transport vehicle (automated guided vehicle, in short "AGV").

Moreover, it is favorable if a plurality of goods are stored in or on the first goods carrier and the gripping pose for one of these goods is calculated. Hence, a particular good can be gripped from or out of a goods carrier in a specific manner.

Moreover, it is advantageous if a contact of the robot head with other goods than the good to be gripped is prevented in the calculation of the gripping pose for the robot head and/or in the motion of the robot head into the gripping pose. Hence, the location and position of the other goods remaining on the goods carrier essentially remains the same also when a particular good is removed. Thus, a gripping surface pose and gripping surface size for multiple goods determined once by the sensor system can be reused for the removal of another good after removal of said good. However, preferably, the gripping surface pose and gripping surface size are determined for each removal of a good from or out of the first goods carrier. Moreover, after each removal, a gripping pose for one of the goods remaining in or on the first goods carrier is again calculated if this good is again required for an order processing (this can relate to the same order or to another order).

It is further advantageous if
  a good is removed from a goods carrier designed as a loading aid, and
  a collision of the robot head with a side wall of the loading aid is prevented in the calculation of the gripping pose for the robot head and/or in the motion of the robot head into the gripping pose.

The location and position of the other goods remaining in the loading aid when a particular good is removed are also essentially maintained by this measure. Thus, here as well, a gripping surface pose and gripping surface size for multiple goods determined once by the sensor system can be reused for the removal of another good after removal of said good, although the gripping surface pose and the gripping surface size are preferably determined for each removal of a good. Moreover, by the suggested measures, damage to the loading aid and/or the robot head is of course prevented too.

Accordingly, it is favorable if
  multiple gripping poses are calculated, in which a maximum number of suction grippers is in contact with the gripping surface of the mentioned good,
  the calculated gripping poses are checked for collisions with other goods than the good to be gripped and/or with a side wall of the loading aid prior to the movement of the robot head, and
  the robot head is moved into one of the collision-free gripping poses.

It is also particularly advantageous if for rotation into the calculated gripping pose the robot head is rotated in the direction in which, starting out from a current pose, the smallest rotational angle for the mentioned rotation is required. Hence, the robot head can be quickly rotated into a gripping pose required for gripping a good. At this point, it should be noted that the rotation mentioned above refers not only to a rotation of the robot head about the vertical axis, but also refers to rotations about a horizontal axis or about a general axis (corresponding to a combination of a rotation of the robot head about the vertical axis and about a horizontal axis), for example when the good to be gripped lies in the tilted position in or on the goods carrier.

Accordingly, it is also favorable if the robot head, when there are multiple collision-free gripping poses, is moved into that gripping pose for which based on the current pose of the robot head the shortest way and/or the smallest rotation angle is required. Hence, short cycle times are achieved.

Moreover, it is particularly advantageous if in the calculation of the gripping pose for the robot head and/or in the motion of the robot head into the gripping pose, a centroid of the area of the suction grippers to be activated corresponds with a centroid of the area of the gripping surface of the mentioned good. Hence, an even load on the suction grippers can be achieved and/or tilting of the gripped good can be avoided. This in particular holds true where the mass distribution in the gripped good is homogeneous.

Furthermore, it is particularly advantageous if in the calculation of the gripping pose and/or in the motion of the robot head into the gripping pose, a centroid of the area of the suction grippers to be activated corresponds with a center of mass of the mentioned good projected vertically onto the gripping surface. This variant is particularly advantageous where the mass distribution in the gripped good is not homogeneous and gripping the good at the centroid of the area of the gripping surface would not result in an even load on the suction grippers. Instead, the centroid of the area of the suction grippers to be activated corresponds with the center of mass of the mentioned good projected vertically onto the gripping surface, whereby, in turn, an even load on the suction grippers can be achieved, and/or tilting of the gripped good can be prevented. For realizing this method variant, knowledge of the mass distribution in the good to be gripped is required. For example, it can be determined in the beginning and be stored in a database. For example, the center of mass of a combo-pack containing pasta and a jar of tomato sauce can be empirically determined and stored in a database. By determining the gripping surface pose and accessing the database, consequently, the center of mass projected vertically onto the gripping surface can be determined. For example, an imprint on the combo-pack may also be used to determine the position of the center of mass relative to the packaging. Thus, it would also be conceivable that the database contains information about the location of the center of mass relative to a packaging, in particular relative to an imprint on said packaging.

It is favorable for the sensor system to comprise a camera and/or a room depth sensor and/or a laser scanner and/or an ultrasonic sensor. By means of these sensors, a gripping surface pose and a gripping surface size of a gripping surface of a good are determined. By means of a camera (stereo camera), a room depth sensor, a laser scanner or an ultrasonic sensor, a three-dimensional image of the good lying in or on the goods carrier can be captured. Hence, in particular an inclined position of the gripping surface can also be detected, which is caused by a tilted position of the good to be gripped in or on the goods carrier. Moreover, by the three-dimensional detection of the goods a surface structure of the gripping surface can be detected as well and the suitability for gripping by means of the suction grippers can be determined. For example, highly convex surfaces are less suitable for gripping by a suction gripper, whereas plane surfaces are particularly well-suited for said gripping. A camera is in particular also suited for capturing a surface character of the good to be gripped, for example an imprint on packaging. Hence, for example the location of a center of mass of said goods in relation to the packaging can be determined. In the case of known shapes of the gripping surface, an inclined position can also be determined via the distorted image with merely one two-dimensional image. An inclined position of the gripping surface can moreover be determined by means of a two-dimensional image which was created using multiple two-dimensional images. These two-dimensional images can, for example, come from stereometrically arranged cameras or can also be captured during a relative movement between the good and the camera. In this regard, the (individual) camera can move in relation to the non-moving good or vice versa.

At this point, it should be noted that the suggested method and/or the suggested robot can be used not only for gripping rigid goods, such as boxes, but also for gripping deformable goods, such as sacks or bags. Both rigid goods and deformable goods can be formed by an object that can be handled individually and/or be formed by a group of objects that can be handled individually. In concrete terms, a good may therefore take the form of a cardboard or plastic box, which is for example filled with multiple objects. Likewise, a good may take the form of a sack or a bag which is filled with multiple objects. The method and/or the robot system according to the invention is particularly well-suited for goods in the form of foil bags, in particular in the form of so-called "polybags" and/or "plastic bags" made from polyethylene or polypropanol. Such foil bags are predominantly used in the textile industry and are for example used for packaging T-shirts, shirts and the like. Often, such foil bags are also used in the shoe industry or in the food industry.

Moreover, it is advantageous for each suction gripper to be controllable separately. Hence, the suction gripper required for gripping a good can be controlled in a specific manner and unnecessary suction of air via the suction grippers that are not required is prevented.

It is also particularly advantageous if a holding status of each suction gripper can be determined separately. Hence, it can be found whether a holding force is established by a suction gripper brought into contact with the gripping surface of a good to be gripped.

Moreover, it is particularly advantageous if the robot comprises precisely three suction grippers, since a plane is defined by the three suction grippers and a good can thus be held particularly securely, if all three suction grippers are activated.

Moreover, it is advantageous for the robot to be designed as a jointed-arm robot or a gantry robot. These designs are proven and tested means for manipulating goods and are available on the market in a wide variety of types.

Finally, it is advantageous if the working area of the storage and order-picking system is designed for fully automated order-picking of goods, and a first conveying device for transporting goods in or on first goods carriers (storage loading aids, in particular containers) is arranged between the storage area and the robot in the working area, and/or a second conveying device for transporting goods in or on second goods carriers (order loading aids, in particular cardboard boxes) is provided between the storage area and the robot in the working area, wherein the robot is designed for removing at least one good from or out of the first goods carriers (storage loading aid, in particular container) for each order and to place the at least one good in or on the second goods carriers (order loading aid, in particular cardboard boxes) for this order. Hence, an order-picking operation can be carried out particularly efficient and fast.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

Figure 1:
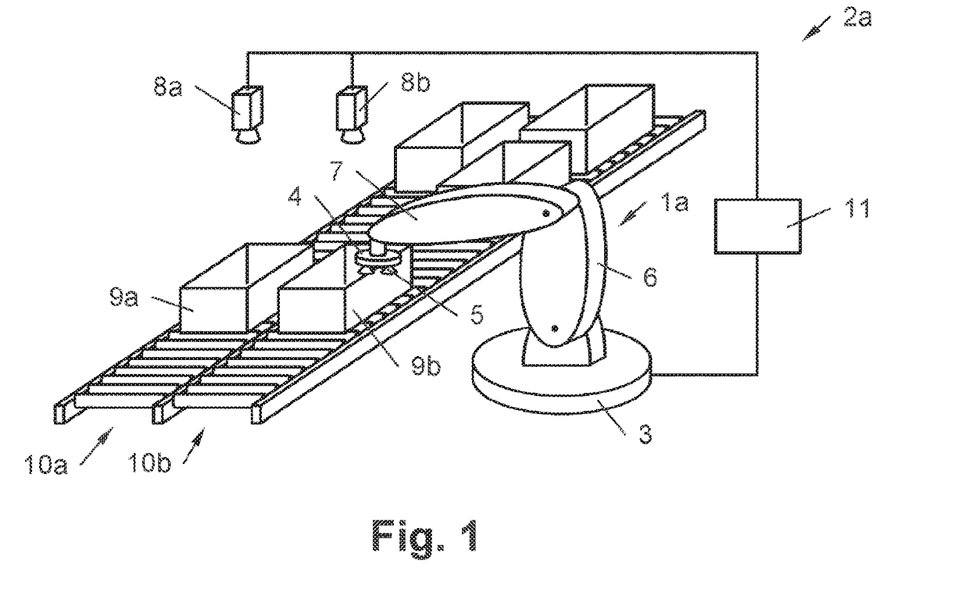
FIG. 1 a first simplified example of a robot system having a robot and a stationarily installed camera system in an oblique view.

FIG. 1 shows a robot 1a in a robot system 2a. The robot 1a comprises a robot head 4 which is movable in relation to a robot base 3 and which comprises three suction grippers 5 spaced apart from one another in this example. The robot head 4 is connected to the robot base 3 in an articulated manner via a robot arm comprising two arm segments 6 and 7. Moreover, FIG. 1 shows a sensor system 8a, 8b, which serves for the detection of a gripping surface pose and a gripping surface size of a gripping surface of a good and, in the present example, comprises two cameras. However, the goods are not visible in FIG. 1 since they are stored in the goods carriers 9a and 9b, which are designed as containers. The container 9a is a source container from which goods are gripped/removed by the robot head 4, and the container 9b is a target container, into which goods are placed/thrown by the robot head 4. The cameras 8a, 8b are arranged above the containers 9a and 9b and are each designed as a stereo camera in this example. Accordingly, the cameras 8a, 8b detect a three-dimensional image of the inside of at least the containers 9a and 9b and the goods stored therein. In general, it is also possible that merely the camera 8a (stereo camera) is provided above the container 9a. Furthermore, it is conceivable that merely one common camera 8a (stereo camera) is provided for the containers 9a and 9b. Although stereo cameras are used in a preferred embodiment, the cameras 8a, 8b can also be designed as a camera for detecting a two-dimensional image of the inside of at least the containers 9a and 9b and the goods stored therein.

The arrangement shown in FIG. 1 further comprises a conveying device for transporting the containers 9a, 9b to the robot system 2a and for transporting the containers 9a, 9b away from the robot system 2a. In particular, the conveying device comprises a first conveying path 10a for transporting the containers 9a, 9b to the robot system 2a and a second conveying path 10b for transporting the containers 9a, 9b away from the robot system 2a. Lastly, the arrangement shown in FIG. 1 comprises a controller 11, which is connected to the cameras 8a, 8b and the robot 1a and serves for calculating from the determined gripping surface pose and gripping surface size a gripping pose for the movable robot head 4 in which a maximum number of suction grippers 5 is in contact with the gripping surface of the mentioned good. Moreover, the controller 11 serves for moving the robot head 5 into the calculated gripping pose and for activating the suction grippers 5 that are in contact with or are coming into contact with the gripping surface of the mentioned good, so as to grip the good. The precise alignment of the robot head 5 is not shown in detail in FIG. 1, is, however, elucidated in more detail by means of FIGS. 8 to 10.

Figure 2:
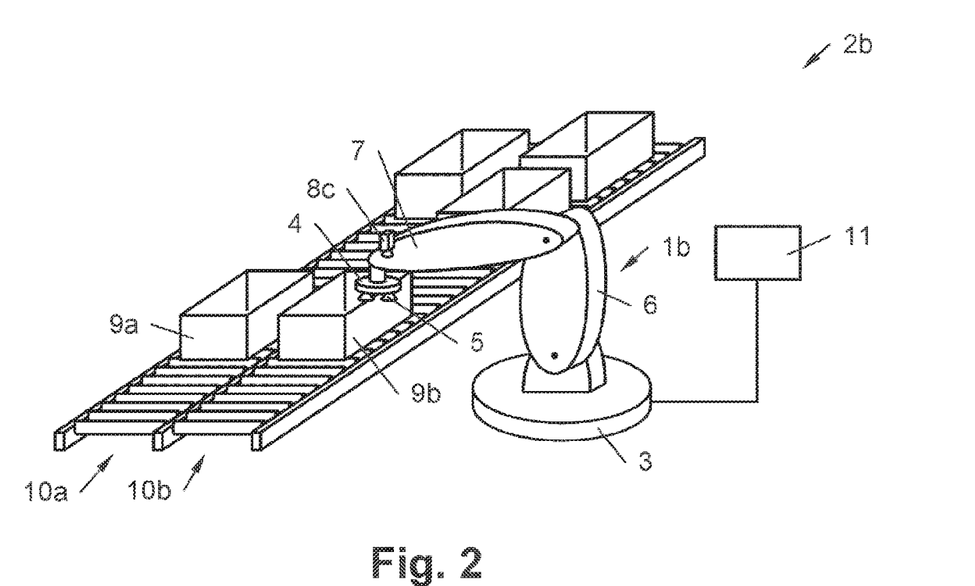
FIG. 2 similar as in FIG. 1, but with a movable camera system having a camera mounted on a robot arm segment of the robot.

FIG. 2 shows a robot system 2b which is very similar to the robot system 2a shown in FIG. 1. In contrast, however, no cameras 8a, 8b are arranged above the containers 9a and 9b, but a single camera 8c is arranged directly on the second arm segment 7 of the robot 1b. This camera 8c is also connected to a controller 11 (connection not shown). This camera 8c can, in turn, be designed as a stereo camera, to detect a three-dimensional image of the containers 9a and 9b as well as the goods stored therein, for example by the camera 8c being moved above the container 9a or above the container 9b by means of the robot 1a and an image being detected there. However, it would also be conceivable that the camera 8c is designed merely for detecting a two-dimensional image, and a three-dimensional image of the containers 9a and 9b as well as of the goods stored therein is generated by detecting multiple two-dimensional images during a movement of the camera 8c and subsequent calculation of the three-dimensional image. At this point, it should also be noted that the camera 8c can also be combined with the cameras 8a, 8b of the robot system 1a of FIG. 1.

Figure 3:
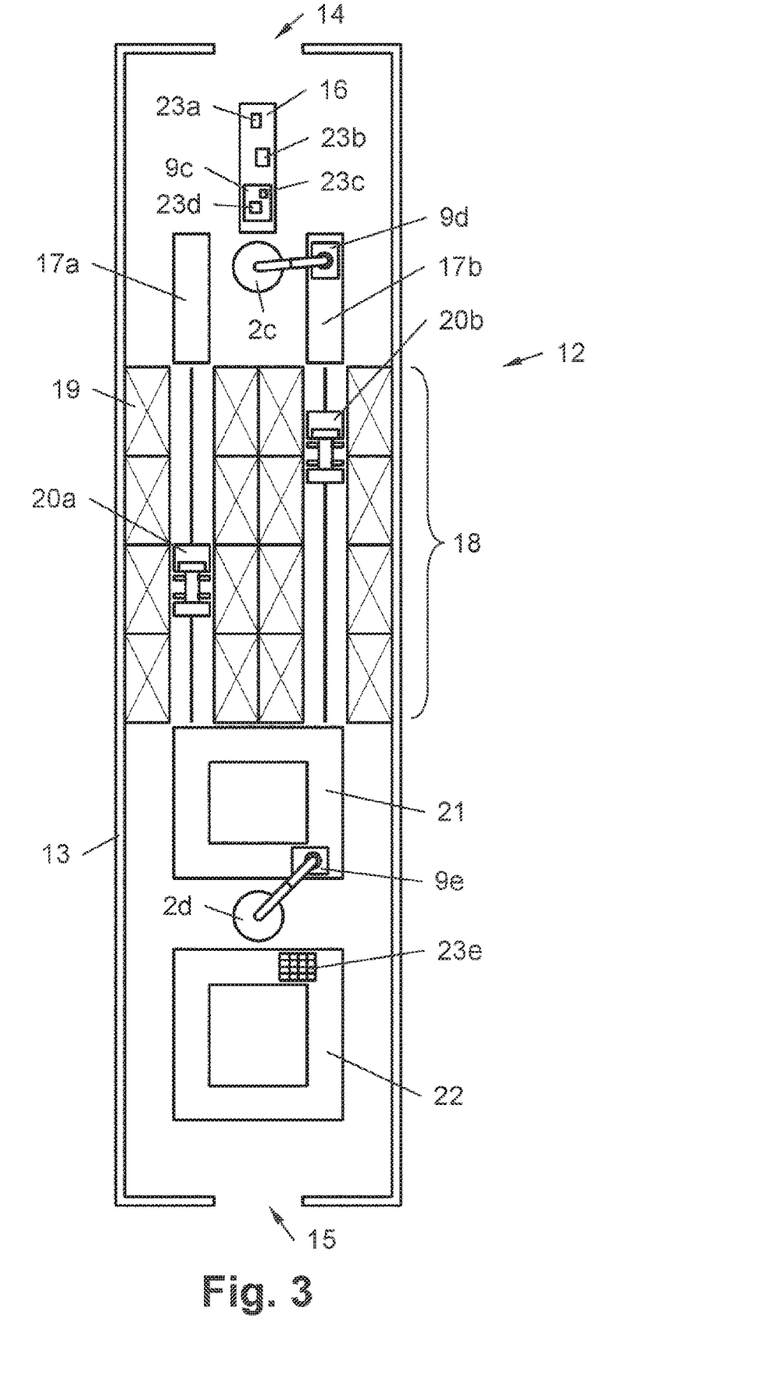
FIG. 3 a schematically shown example of a storage and order-picking system in a top view.

FIG. 3 shows a storage and order-picking system 12 comprising a building 13 as well as a gate at a goods receiving 14 and a gate at a goods issue 15. In the region of the goods receiving 14, there is a first conveying path 16 and two second conveying paths 17a and 17b. The first conveying path 16 connects the goods receiving 14 to the robot system 2c. The two second conveying paths 17a and 17b connect the robot system 2c to a storage area 18, which comprises multiple storage racks 19 as well as storage and retrieval units 20a and 20b, which move in rack aisles running between the storage racks 19. At that end of the rack aisles, which is opposite to the second conveying paths 17a and 17b, there is a third conveying path 21, which is designed annularly and leads to a further robot system 2d in the present example. A fourth conveying path 22, which connects the robot system 2d to the goods issue 15 in terms of conveyance, is arranged in the operating range of the robot system 2d as well.

Figure 4:
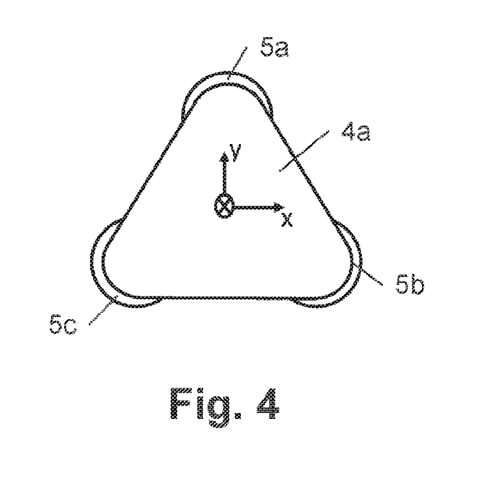
FIG. 4 an exemplary robot head having three suction grippers in a top view.
Figure 5:
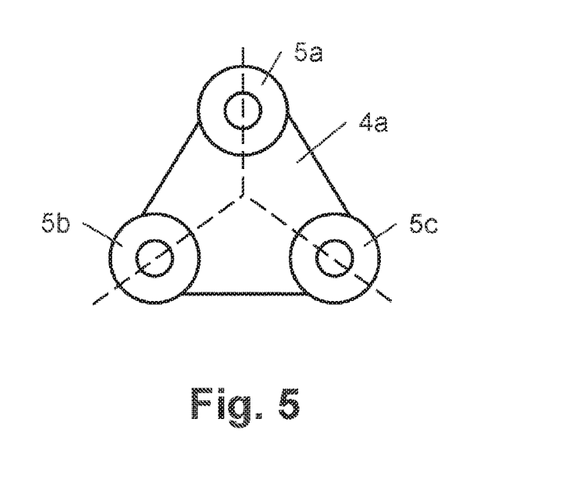
FIG. 5 the robot head from FIG. 4 in a bottom view.

FIG. 4 shows a robot head 4a with three suction grippers 5a, 5b and 5c from the top and in a detailed view. FIG. 5 shows the robot head 4a with the three suction grippers 5a, 5b and 5c from below.

Figure 6:
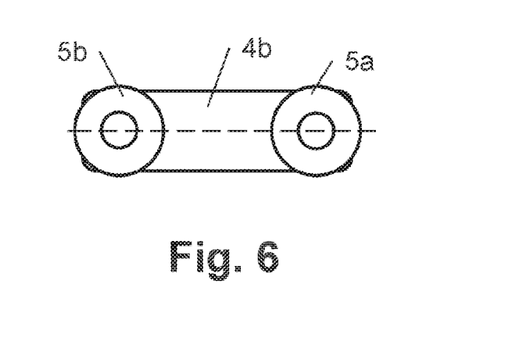
FIG. 6 an exemplary robot head having two suction grippers in a bottom view.
Figure 7:
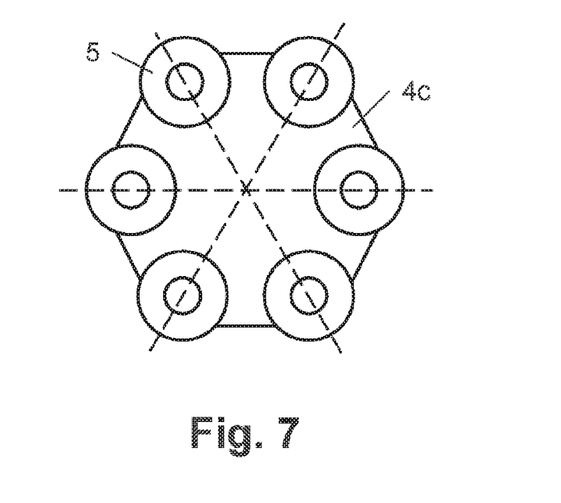
FIG. 7 an exemplary robot head having six suction grippers in a bottom view.

FIG. 6 shows a further embodiment of a robot head 4b with two suction grippers 5a and 5b from below. FIG. 7 shows a further embodiment of a robot head 4c with six suction grippers 5 from below. Of course, an embodiment of a robot head 4, in which three suction grippers 5a . . . 5c are arranged in one line, as is the case in the exemplary embodiment according to FIG. 6, is also conceivable.

In the examples according to FIGS. 4 to 7, the suction grippers 5, 5a . . . 5c in each case form one suction gripper unit.

Figure 8:
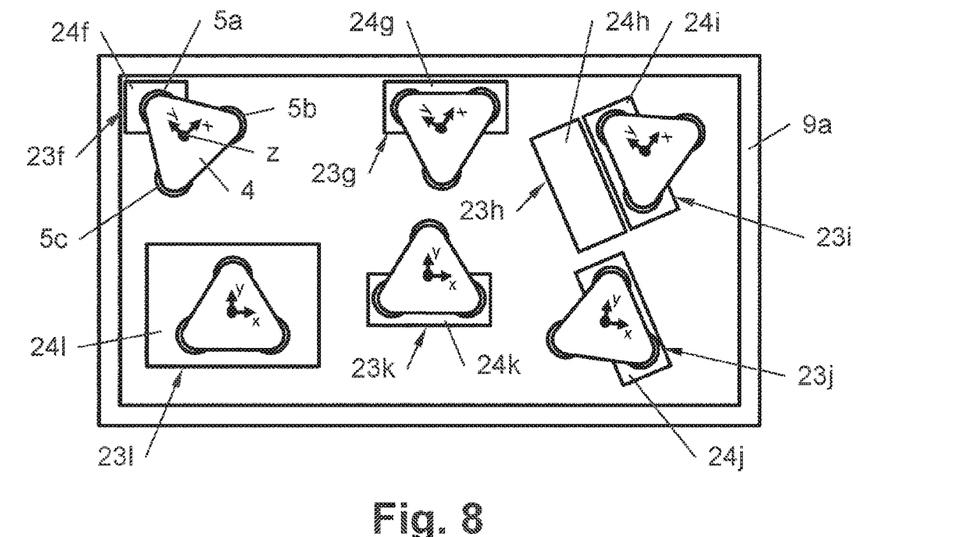
FIG. 8 a loading aid (for example a container) storing multiple different goods of a first type of goods (rigid goods, such as boxes) and gripping poses of a robot head assigned to the respective goods.
Figure 9:
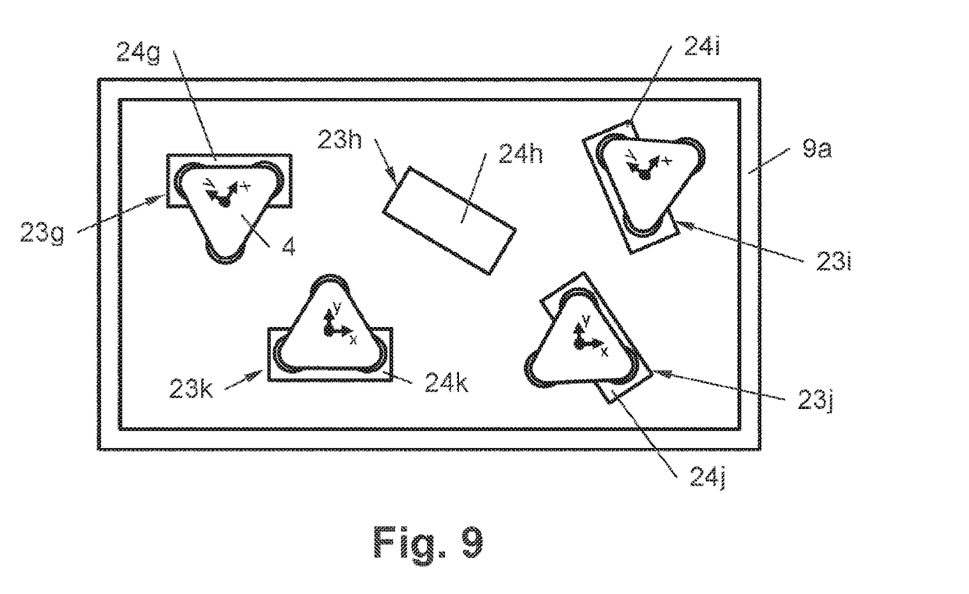
FIG. 9 a loading aid (for example a container) storing multiple identical (of just one type) goods (the same goods of a first type of goods, such as boxes) and gripping poses of a robot head assigned to the respective goods, and FIG. 10 an example of a loading aid (for example a container) storing multiple different goods of a second type of goods (deformable goods, such as polybags) and gripping poses of a robot head assigned to the respective goods.
Figure 10:
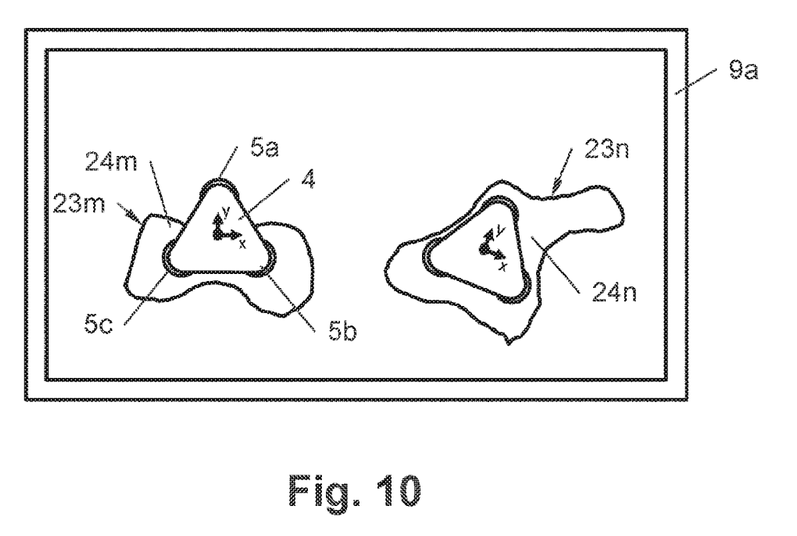

FIGS. 8 to 10 now each show multiple goods 23f . . . 23n which are stored in goods carriers 9a, which are designed as box-shaped containers in this example. Furthermore, the robot head 4 with the suction grippers 5a . . . 5c can be seen in different gripping poses.

The function of the arrangements shown in the figures is now explained in detail below:

In a first step, a gripping surface pose and a gripping surface size of a gripping surface of a good is determined using the sensor system 8a, 8b (here with the aid of two stereo cameras) shown in FIG. 1. In a specific example, the good 23f is referred to for this purpose. The good 23f has a gripping surface 24f pointing upwards, which is designed to be rectangular and plane in this example. It can be gathered from the determined gripping surface size that merely one of the suction grippers 5a . . . 5c can be brought into contact with the gripping surface 24f. Accordingly, the controller 11 calculates a gripping pose for the movable robot head 4 in which the suction gripper 5a is in contact with the gripping surface 24f. Then, the robot head 4 is moved into the calculated gripping pose shown in FIG. 8 and the suction gripper 5a that is in contact with or during the movement of the robot head 4 will come into contact with the gripping surface 24f is activated, so as to grip the good 23f.

Further goods 23g . . . 23l are in the container 9a. In this respect, the goods 23g . . . 23k each have a gripping surface 24g . . . 24k which can be brought into contact with two suction grippers 5a and 5b in each case. The good 23l, in turn, has a gripping surface 24l, which can be brought into contact with all three suction grippers 5a, 5b and 5c.

It can in particular be gathered from FIG. 8 that a gripping pose for the movable robot head 4 is calculated in which a maximum number of suction grippers 5a . . . 5c is in contact with a gripping surface 24f . . . 24l of a good 23f . . . 23l, also if the respective gripping surface 24f . . . 24l is not large enough to be in contact with all three suction grippers 5a . . . 5c of the robot head 4. By the suggested measures, it is ensured that the goods 23f . . . 23l can each be gripped securely according to the sizes of their gripping surfaces 24f . . . 24l and that incorrect gripping and/or falling of the respective good 23f . . . 23h from the robot head 4 can be avoided.

It can further be gathered from FIG. 8 that in the calculation of the gripping pose for the robot head 4 and/or in the motion of the robot head 4 into the gripping pose, a centroid of the area of the suction grippers 5a . . . 5c to be activated corresponds with a centroid of the area of the respective gripping surface 24f . . . 24l of the respective good 23f . . . 23l. The centroid of the area of a suction gripper 5a is in the center of the circular suction gripper 5a, the centroid of the area of two suction grippers 5a, 5b is in the center of the connecting line of the two centers of circles of the suction grippers 5a, 5b and the centroid of the area of three suction grippers 5a . . . 5c is on the z axis shown in FIG. 8. By the suggested measures, an even load on the suction grippers 5a . . . 5c can be achieved and/or tilting of the gripped good 23f . . . 23l can be avoided. This in particular holds true where the mass distribution in the gripped good 23f . . . 23l is homogeneous.

If this condition does not apply or does not apply sufficiently, then the centroid of the area of the suction grippers 5a . . . 5c to be activated advantageously corresponds with a center of mass of the mentioned good 23f . . . 23l projected vertically upwards in the calculation of the gripping pose and/or in the motion of the robot head 4 into the gripping pose. Hence, an even load on the suction grippers 5a . . . 5c can be achieved even then and tilting of the good 23f . . . 23l can be prevented if the mass distribution within the good 23f . . . 23l is not homogeneous. For realizing this method variant, knowledge of the mass distribution in the good 23f . . . 23l to be gripped is required. For example, it can be determined empirically and be stored in a database. By determining the gripping surface pose and accessing said database, consequently, the center of mass projected vertically onto the gripping surface 24f . . . 24l can be determined. This embodiment variant is thus particularly well-suited for combo-packs which contain goods of differing weight. In this case, for example, an imprint on these combo-packs can be used to determine the position of the center of mass of the combo-pack relative to the outer contour of the packaging. Thus, information about the location of the center of mass relative to a packaging and/or relative to an imprint on said packaging can be stored in the mentioned database. For detecting said imprint, it is advantageous if the sensor system comprises cameras 8a . . . 8c for detecting a gripping surface pose and a gripping surface size, as is shown in FIGS. 1 and 2.

It can further be seen from FIG. 8 that a plurality of goods 23f . . . 23l is stored in the first goods carrier 9a designed as a box-shaped container and a gripping pose for one of these goods 23f . . . 23l is calculated. This means that a specific good 23f . . . 23l is removed from the goods carrier 9a in a specific manner.

In general, it is advantageous if a contact of the robot head 4 with other goods than the good 23f . . . 23l to be gripped is prevented in the calculation of the gripping pose for the robot head 4 and/or in the motion of the robot head 4 into the gripping pose. Likewise, it is advantageous if a collision of the robot head 4 with a side wall of the container 9a is prevented in the calculation of the gripping pose for the robot head 4 and/or in the motion of the robot head 4 into the gripping pose. Hence, the location and position of the other goods 23g . . . 23l remaining in the container 9a is essentially maintained when a particular good 23f is removed. Thus, a gripping surface pose and gripping surface size for multiple goods 23f . . . 23l determined once by the cameras 8a . . . 8c can be reused for the removal of a further good 23g . . . 23l after removal of said good 23f. However, preferably, the gripping surface pose and gripping surface size are determined prior to each removal of a good 23g . . . 23l. Moreover, by the suggested measures, damage to the container 9a and/or the robot head 4 is prevented too.

In particular, multiple gripping poses in which a maximum number of suction grippers 5a . . . 5c is in contact with the gripping surface 24f . . . 24l of the mentioned good 24f . . . 24l are calculated. Then, prior to the motion of the robot head 4, the calculated gripping poses are checked for collisions with other goods than the good 23g . . . 23l to be gripped and/or with a side wall of the container. Lastly, the robot head 4 is moved into of the collision-free gripping poses. For example, in FIG. 8 two suction grippers 5a and 5b (and thus the maximum number of suction grippers 5a . . . 5c) would be in contact with the gripping surface 24g of the good 23g also if the robot head 4 were rotated about the vertical z axis by 180°; however, this would result in a collision with a side wall of the container 9a. Thus, the robot head 4 is advantageously not moved into this gripping pose.

In the calculation of the gripping pose for the robot head 4 and/or in the motion of the robot head 4 into the calculated gripping pose, it is also advantageous if for a rotation into the gripping pose, the robot head 4, starting out from a current pose, is rotated into that direction in which the smallest rotational angle is required for said rotation. With reference to FIG. 8, starting out from the gripping pose for the good 23f, it is advantageous to slightly turn the robot head 4 to the left (in the shown example by approx. 10°) so as to grip the good 23g. This way, the robot head 4 can be quickly rotated into a gripping pose required for gripping a good 23f . . . 23l. It would be less advantageous to rotate the robot head 4 to the right starting out from the gripping pose for the good 23f for gripping the good 23g. The mentioned variant, in this regard, refers not only to rotations about the vertical axis (z axis) but alternatively or additionally also to rotations about a horizontal axis (x axis and/or y axis), for example where the goods 23f . . . 23l to be gripped are lying in the container 9a or standing in the container 9a in a tilted orientation.

In particular, when there are multiple collision-free gripping poses, the robot head 4 is moved into that gripping pose for which based on the current pose of the robot head 4 the shortest way and/or the smallest rotation angle is required. Hence, short cycle times are achieved.

Moreover, it is advantageous if each suction gripper 5a . . . 5c can be controlled separately, since thereby unnecessary suction of air via the suction grippers 5a . . . 5c that are not required can be prevented.

In addition to this, it is advantageous if a holding status of each suction gripper 5a . . . 5c can be detected separately via sensors (not depicted), since this way it can be determined whether a holding force is established by one of the suction grippers 5a . . . 5c brought into contact with the gripping surface 24f . . . 24l.

FIG. 9 shows an example in which the container 9a is loaded with goods 23g . . . 23k of just one type. Moreover, the goods 23g . . . 23k lie in the container 9a such that in each case a gripping surface 24b . . . 24k of the same size points upwards. At this point, it should be noted that even a container 9a loaded so as to contain articles of just one type can contain goods 23g . . . 23k having different gripping surfaces 24b . . . 24k that point upwards, for example if some of the goods 23g . . . 23k lie in the container 9a and other goods 23g . . . 23k stand in the container 9a. Accordingly, it can be provided for that the robot head 4 is rotated about a horizontal axis if the largest gripping surface 24g . . . 24k can be gripped in this orientation of the robot head 4. It would also be conceivable that a standing good 23g . . . 23k is knocked over by the robot head 4 prior to being gripped, so as to allow for easier contact with the largest gripping surface 24b . . . 24k.

The goods 23f . . . 23l shown in FIGS. 8 and 9 each have a rectangular gripping surface 24f . . . 24l. However, this is not an obligatory condition but the gripping surfaces of the goods to be gripped can also be shaped irregularly, as is shown in FIG. 10 for the goods 23m and 23n. What has been said with regard to the goods 23f . . . 23l can be analogously applied to the goods 23m and 23n. In this context, reference is made to the fact that the goods 23a . . . 23n are not necessarily rigid bodies but can for example also be designed as a bag or a sack. In particular, the container 9b shown in FIG. 10 can, in turn, be loaded with goods 23m and 23n of just one type.

FIGS. 1 and 2 show the process when loading goods 23a . . . 23n from a first goods carrier 9a (source container) into a second goods carrier 9b (target container) using the robot head 4. The goods carriers 9a and 9b formed as box-shaped containers are transported to the robot 1a, 1b by means of the conveying devices 10a and 10b for the loading operation and transported away from the robot 1a, 1b after the loading operation. However, the transport of the goods 23a . . . 23n using loading aids 9a and 9b is no necessary requirement, but the goods 23a . . . 23n can also be transported directly on the conveying device if this for example comprises a belt conveyor, a modular belt conveyor and the like as the first conveying path 10a and a belt conveyor, a modular belt conveyor and the like as the second conveying path 10b. Of course, roller conveyors 10a and 10b can be provided as well. Likewise, other loading aids, such as trays or cardboard boxes, can be provided in place of the containers 9a and 9b. Such loading aids comprise a bottom, side walls rising up from the bottom and a loading opening bounded by the side walls. However, the use of pallets as a loading aid is also conceivable.

If in the region of the robot system 2a, 2b loading aids (containers, trays, cardboard boxes) from which or out of which goods 23a . . . 23n are removed by means of the suction grippers 5, 5a . . . 5c are used as first goods carriers, the (source) loading aids can advantageously be loaded with goods 23a . . . 23n of just one type or be loaded compartmentalized with goods 23a . . . 23n of just one type. For example, a first loading aid contains the good "A", a second loading contains the good "B" and so on. As opposed to this, it is also possible that a loading aid is divided into multiple receiving compartments by means of dividing walls and can accommodate different goods "A", "B", wherein a good "A" can be accommodated in the first receiving compartment and a good "B" can be accommodated in the second receiving compartment.

FIG. 3 shows a fairly more complex arrangement, in specific terms a storage and order-picking system 12. In this regard, goods 23a . . . 23e are delivered to the goods receiving 14, loaded onto the first conveying path 16, transferred from the first conveying path 16 to the second conveying paths 17a and 17b by the robot system 2c and stored in the storage racks 19 by means of the storage and retrieval units 20a and 20b. The first conveying path 16 in this operation acts as the first goods carrier and/or the source, whereas the second conveying paths 17a and 17b in this operation act as the second goods carrier and/or the target.

When a picking order is to be processed, the goods 23a . . . 23e assigned to the order are removed from at least one storage rack 19 using at least one storage and retrieval unit 20a and 20b and transferred to the third conveying path 21. Then, the goods 23a . . . 23e are transported to the robot system 2d using the third conveying path 21 and transferred from the third conveying path 21 to the fourth conveying path 22 by said robot system 2d and are lastly transported to the goods issue 15 using the fourth conveying path 22. The third conveying path 21 in this operation acts as the first goods carrier and/or the source, whereas the fourth conveying path 22 in this operation act as the second goods carrier and/or the target.

As can be seen from FIG. 3, the goods 23a, 23b and 23e are transported directly on the conveying paths 16, 17a, 17b, 21 and 22 acting as goods carriers, whereas the goods 23c and 23d are transported using loading aids 9c . . . 9e, which accordingly also act as goods carriers. Thus, FIG. 3 shows a mixed type of transport. It would certainly also be conceivable that the goods 23a . . . 23e are transported solely on the conveying paths 16, 17a, 17b, 21 and 22 acting as goods carrier or solely using the loading aids 9c . . . 9e.

Of course, the design and arrangement of the conveying paths 16, 17a, 17b, 21 and 22 in FIG. 3 is to be considered illustrative and other formations and arrangements of the mentioned conveying paths 16, 17a, 17b, 21 and 22 are also conceivable. In particular, an annular conveying path could be arranged at the goods receiving 14, or linear conveying paths could be provided at the goods issue 15. The conveyor connection of the robot system 2c and 2d to the goods receiving 14, to the storage area 18 and to the goods issue 15 is not necessarily established via stationary conveying means, as shown in FIG. 3, but could also take place in whole or in part via autonomous transport vehicles (in particular autonomous floor conveyors), whose loading platforms then also serve as goods carriers.

It would further be conceivable that the goods 23a . . . 23e are loaded directly onto the storage and retrieval units 20a and 20b by the robot system 2c or are taken over directly from the storage and retrieval units 20a and 20b by the robot system 2d. In this case, the loading platforms of the storage and retrieval units 20a and 20b also serve as goods carriers.

At this point, it should also be noted that the robots 1a and 1b do not necessarily have to be designed as jointed-arm robots, but can also be designed for example as gantry robots.

It should further be noted that the sensor system can not only comprise cameras 8a . . . 8c, but alternatively or additionally also a room depth sensor, a laser scanner and/or an ultrasonic sensor. Using these sensors, not only a two-dimensional but also a three-dimensional image of the goods 23a . . . 23n lying in or on a goods carrier (for example in the containers or on the conveying paths) can be detected. Accordingly, an inclined position of a gripping surface 24a . . . 24n can also be detected, which is caused for example by a tilted position of the good 23a . . . 23n to be gripped in or on the goods carrier. Moreover, by the three-dimensional detection a surface structure of the gripping surface 24a . . . 24n can be detected as well and the suitability for gripping by means of the suction grippers 5, 5a . . . 5c can be determined. For example, highly convex surfaces are less suitable as gripping surface 24a . . . 24n, whereas plane surfaces are particularly well-suited as gripping surfaces 24a . . . 24n. At this point, it should be noted that a surface structure and/or an inclined position of a gripping surface 24a . . . 24n, due to the distorted image, can also be determined using a camera for detecting a two-dimensional image if the shape of the gripping surface 24a . . . 24n is generally known.

It should also be noted that the goods 23a . . . 23n may be arranged in or on the first goods carrier 9a, 9c, 9e, 10a, 16, 21 next to each other, on top of each other, standing upright or lying, in particular disordered (chaotic) and/or in a random arrangement.

Moreover, it is conceivable that multiple two-dimensional images are captured by a relative movement between the camera and the gripping surfaces 24a . . . 24n and a two-dimensional image of the mentioned gripping surfaces 24a . . . 24n is calculated therefrom.

Finally, it should also be noted that the scope of protection is determined by the claims. However, the description and the drawings are to be adduced for construing the claims.

Individual features or feature combinations from the different exemplary embodiments shown and described may represent independent inventive solutions. The object underlying the independent inventive solutions may be gathered from the description.

In particular, it should also be noted that the devices shown may in reality comprise more or less components than those shown. In some cases, the shown devices and/or their components may not be depicted to scale and/or be enlarged and/or reduced in size.

LIST OF REFERENCE NUMBERS 1a, 1b robot
2a . . . 2d robot system
3 robot base
4, 4a . . . 4c robot head
5, 5a . . . 5c suction gripper
6 first robot arm segment
7 second robot arm segment
8a . . . 8c camera (sensor system)
9a . . . 9e container (goods carrier)
10a, 10b conveying device (goods carrier)
11 controller
12 storage and order-picking system
13 building wall
14 goods receiving
15 goods issue
16 first conveying path (goods carrier)
17a, 17b second conveying path (goods carrier)
18 storage area
19 storage rack
20a, 20b storage and retrieval unit
21 third conveying path (goods carrier)
22 fourth conveying path (goods carrier)
23a . . . 23n good(s)
24a . . . 24n gripping surface

The invention claimed is:

1. A method for picking goods using a robot in a storage and order-picking system, the robot having a robot head movable in relation to a robot base and comprising at least two suction grippers spaced apart from one another, the method comprising the steps:
   providing one or a plurality of the goods in a loading aid comprising a bottom, side walls rising up from the bottom, and a loading opening bounded by the side walls,
   determining by a sensor system a gripping surface pose and a gripping surface size of a gripping surface of a good to be gripped provided in the loading aid,
   calculating a gripping pose for the movable robot head based on the determined gripping surface pose and gripping surface size of the good to be gripped such that a maximum number of suction grippers are in contact with the gripping surface of the good, wherein a calculated gripping pose for the robot head or a calculated motion of the robot head into the gripping pose prevents a collision of the robot head with a side wall of the loading aid, and
   moving the robot head into the calculated gripping pose, and activating the suction grippers that will contact the gripping surface of the good so as to grip the good.

2. The method according to claim 1, wherein the good gripped by the robot head is transferred from the loading aid into or onto a goods carrier by the robot head according to an order.

3. The method according to claim 1, wherein the one or the plurality of the goods are picked according to an order, and the method further comprises the steps:
- transporting to the robot the loading aid containing the one or the plurality of the goods to be picked,
- transferring by the robot head the one or the plurality of the goods into or onto a goods carrier, and
- transporting away from the robot by the goods carrier the one or the plurality of the goods transferred into or onto the goods carrier.

4. The method according to claim 1, wherein a plurality of the goods are provided in the loading aid and the gripping pose for one of the plurality of the goods is calculated.

5. The method according to claim 4, wherein the calculated gripping pose for the robot head or the calculated motion of the robot head into the gripping pose prevents contact of the robot head with other goods of the plurality of the goods provided in the loading aid than the good to be gripped.

6. The method according to claim 1, wherein the loading aid comprises at least one of a container, a tray and a box.

7. The method according to claim 1, wherein
- the step of calculating comprises calculating multiple gripping poses such that a maximum number of suction grippers are in contact with the gripping surface of the good,
- the calculated gripping poses are collision-free gripping poses that prevent collisions of the robot head with at least one of the side wall of the loading aid and other goods of the plurality of the goods provided in the loading aid than the good to be gripped, and
- the robot head is moved into one of the collision-free gripping poses.

8. The method according to claim 7, wherein the robot head is moved into the collision-free gripping pose that requires the shortest movement of the robot head or the smallest rotation angle of the robot head based on a current pose of the robot head.

9. The method according to claim 1, wherein, starting out from a current pose for the robot head, the calculated gripping pose for the robot head is determined such that the smallest rotational angle for the robot head is required.

10. The method according to claim 1, wherein for calculating the gripping pose for the robot head or for calculating the motion of the robot head into the gripping pose or for calculating the gripping pose for the robot head and the motion of the robot head into the gripping pose, the gripping pose is defined so that a centroid of the area of the suction grippers corresponds with a centroid of the area of the gripping surface of the good to be gripped.

11. The method according to claim 1, wherein for calculating the gripping pose for the robot head or for calculating the motion of the robot head into the gripping pose or for calculating the gripping pose for the robot head and the motion of the robot head into the gripping pose, the gripping pose is defined so that a centroid of the area of the suction grippers to be activated corresponds with a center of mass of the good to be gripped, and the suction grippers are projected vertically onto the gripping surface of the good to be gripped.

12. A robot system for picking goods from a loading aid, comprising:
- a robot having a robot head that is movable in relation to a robot base and is equipped with at least two suction grippers spaced apart from one another,
- a sensor system for detecting a gripping surface pose and a gripping surface size of a gripping surface of a good to be gripped,
- a controller configured to calculate a gripping pose for the movable robot head such that a maximum number of suction grippers is in contact with the gripping surface of the good to be gripped based on the detected gripping surface pose and gripping surface size of the good to be gripped,
- wherein a calculated gripping pose for the robot head or a calculated motion of the robot head into the gripping pose prevents a collision of the robot head with a side wall of the loading aid, and
- wherein the robot head is moved into the calculated gripping pose, and the suction grippers that will contact the gripping surface of the good to be gripped are activated to grip the good.

13. The robot system according to claim 12, wherein the sensor system comprises at least one of a camera, a room depth sensor, a laser scanner, and an ultrasonic sensor.

14. The robot system according to claim 12, wherein each one of the suction grippers can be controlled separately.

15. The robot system according to claim 12, wherein a holding status of each one of the suction grippers can be determined separately.

16. The robot system according to claim 12, wherein the robot comprises precisely three suction grippers.

17. The robot system according to claim 12, wherein the robot is designed as a jointed-arm robot or a gantry robot.

18. A storage and order-picking system for order-picking of goods comprising:
- a storage area for storing goods, and
- a working area for automatically picking or repacking goods using a robot system, the robot system comprising:
  - a robot having a robot head that is movable in relation to a robot base and is equipped with at least two suction grippers spaced apart from one another,
  - a sensor system for detecting a gripping surface pose and a gripping surface size of a gripping surface of a good to be gripped,
  - a controller configured to calculate a gripping pose for the movable robot head such that a maximum number of suction grippers is in contact with the gripping surface of the good to be gripped based on the detected gripping surface pose and gripping surface size of the good to be gripped,
  - wherein a calculated gripping pose for the robot head or a calculated motion of the robot head into the gripping pose prevents a collision of the robot head with a side wall of a loading aid, and
  - wherein the robot head is moved into the calculated gripping pose, and the suction grippers that will contact the gripping surface of the good are activated to grip the good.

19. The storage and order-picking system according to claim 18, further comprising:
- the loading aid containing one or a plurality of the goods and a goods carrier for receiving goods of an order from the one or the plurality of the goods stored in the loading aid,
- a first conveying device for transporting the loading aid to the robot and away from the robot, and
- a second conveying device for transporting the goods carrier to the robot and away from the robot, wherein the robot is configured to grip at least one good from the loading aid and to place the at least one good in or on the goods carrier to fulfill the order.

20. A method for picking goods using a robot in a storage and order-picking system, the robot having a robot head movable in relation to a robot base and comprising at least two suction grippers spaced apart from one another, the method comprising the steps:
providing a plurality of the goods in a loading aid comprising a bottom, side walls rising up from the bottom, and a loading opening bounded by the side walls,
determining by a sensor system a gripping surface pose and a gripping surface size of a gripping surface of a good to be gripped provided in the loading aid,
calculating gripping poses for the movable robot head based on the determined gripping surface pose and gripping surface size of the good to be gripped such that the calculated gripping poses have a maximum number of suction grippers in contact with the gripping surface of the good to be gripped and prevent collisions of the robot head with at least one of a side wall of the loading aid and other goods of the plurality of the goods provided in the loading aid than the good to be gripped, wherein the calculated gripping poses are collision-free gripping poses,
moving the robot head into one of the collision-free gripping poses that requires the shortest movement of the robot head or the smallest rotation angle of the robot head based on a current pose of the robot head, and
activating the suction grippers that will contact the gripping surface of the good so as to grip the good.

21. The method according to claim 20, wherein the good gripped by the robot head is transferred from the loading aid into or onto a goods carrier by the robot head according to an order.

22. The method according to claim 20, wherein one or the plurality of the goods are picked according to an order, and the method further comprises the steps:
transporting to the robot the loading aid containing the one or the plurality of the goods to be picked,
transferring by the robot head the one or the plurality of the goods into or onto a goods carrier, and
transporting away from the robot by the goods carrier the one or the plurality of the goods transferred into or onto the goods carrier.

23. The method according to claim 20, wherein the gripping poses for the robot head for one of the plurality of the goods are calculated.

24. A robot system for picking goods from a loading aid, comprising:
a robot having a robot head that is movable in relation to a robot base and is equipped with at least two suction grippers spaced apart from one another,
a sensor system for detecting a gripping surface pose and a gripping surface size of a gripping surface of a good to be gripped,
a controller configured to calculate gripping poses for the movable robot head based on the detected gripping surface pose and gripping surface size of the good to be gripped,
wherein the loading aid comprises a bottom, side walls rising up from the bottom, and a loading opening bounded by the side walls,
wherein the calculated gripping poses for the robot head define a maximum number of suction grippers in contact with the gripping surface of the good to be gripped and prevent collisions of the robot head with at least one of a side wall of the loading aid and other goods of a plurality of the goods provided in the loading aid than the good to be gripped, so that the calculated gripping poses are collision-free gripping poses,
wherein the robot head is moved into one of the collision-free gripping poses that requires the shortest movement of the robot head or the smallest rotation angle of the robot head based on a current pose of the robot head, and
wherein the suction grippers that will contact the gripping surface of the good to be gripped are activated to grip the good.

25. A storage and order-picking system for order-picking of goods comprising:
a storage area for storing goods, and
a working area for automatically picking or repacking goods using a robot system, the robot system comprising:
a robot having a robot head that is movable in relation to a robot base and is equipped with at least two suction grippers spaced apart from one another,
a sensor system for detecting a gripping surface pose and a gripping surface size of a gripping surface of a good to be gripped,
a controller configured to calculate gripping poses for the movable robot head based on the detected gripping surface pose and gripping surface size of the good to be gripped,
wherein the loading aid comprises a bottom, side walls rising up from the bottom, and a loading opening bounded by the side walls,
wherein the calculated gripping poses for the robot head define a maximum number of suction grippers in contact with the gripping surface of the good to be gripped and prevent collisions of the robot head with at least one of a side wall of the loading aid and other goods of a plurality of the goods provided in the loading aid than the good to be gripped, so that the calculated gripping poses are collision-free gripping poses,
wherein the robot head is moved into one of the collision-free gripping poses that requires the shortest movement of the robot head or the smallest rotation angle of the robot head based on a current pose of the robot head, and
wherein the suction grippers that will contact the gripping surface of the good to be gripped are activated to grip the good.

* * * * *